(12) United States Patent
Nakate et al.

(10) Patent No.: US 8,676,024 B2
(45) Date of Patent: Mar. 18, 2014

(54) METHOD AND APPARATUS FOR GENERATING DATA REPRESENTING DIGESTS OF PICTURES

(71) Applicant: Victor Company of Japan, Ltd., Yokohama (JP)

(72) Inventors: Shin Nakate, Kanagawa-ken (JP); Wataru Inoha, Kanagawa-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 13/667,042

(22) Filed: Nov. 2, 2012

(65) Prior Publication Data

US 2013/0058630 A1    Mar. 7, 2013

Related U.S. Application Data

(63) Continuation of application No. 12/232,216, filed on Sep. 12, 2008, now Pat. No. 8,331,756.

(30) Foreign Application Priority Data

Oct. 14, 2007    (JP) .................................. 2007-276089

(51) Int. Cl.
*G11B 27/00*    (2006.01)
*H04N 5/93*    (2006.01)

(52) U.S. Cl.
USPC ............. 386/46; 386/278; 386/279; 386/280; 386/281; 386/282; 386/283; 386/284; 386/285; 386/286; 386/287; 386/288; 386/289; 386/290

(58) Field of Classification Search
USPC ............................................ 386/46, 278–290
See application file for complete search history.

(56) References Cited

U.S. PATENT DOCUMENTS

| | | | |
|---|---|---|---|
| 6,807,362 B1 * | 10/2004 | Girgensohn et al. | 386/227 |
| 7,246,369 B1 * | 7/2007 | Duan et al. | 725/115 |
| 2001/0014123 A1 * | 8/2001 | Strasman et al. | 375/240.13 |
| 2004/0249861 A1 | 12/2004 | Hoshino et al. | |
| 2009/0257649 A1 * | 10/2009 | Yamauchi et al. | 382/165 |

FOREIGN PATENT DOCUMENTS

JP    2005-252372    9/2005

\* cited by examiner

*Primary Examiner* — Carl Colin
*Assistant Examiner* — John Elmore
(74) *Attorney, Agent, or Firm* — Louis Woo

(57) ABSTRACT

Video data pieces are classified into groups according to prescribed rules. A cut number assigned to each of the groups is decided on the basis of the length or lengths of a video data piece or pieces in each of the groups and the number of the video data piece or pieces in each of the groups. A cut or cuts are extracted from the video data piece or pieces in each of the groups. Regarding each of the groups, the number of the extracted cut or cuts is equal to the decided cut number. Digest data is generated from the extracted cuts for all the groups.

1 Claim, 7 Drawing Sheets

FIG. 2

| GROUP ID NUMBER | TOTAL PLAY TIME OF IN-GROUP VIDEO DATA PIECES L(n) [SEC] | NUMBER OF IN-GROUP VIDEO DATA PIECES N(n) | $\log(L(n)) \cdot \log(N(n)+1)$ | CUT RATIO P(n) | PARTIAL DIGEST PLAY TIME D(n) [sec] | CUT NUMBER C(n) |
|---|---|---|---|---|---|---|
| 1 | 37 | 2 | 0.748 | 0.038535 | 6.936273 | 1 |
| 2 | 157 | 6 | 1.856 | 0.095616 | 17.21086 | 3 |
| 3 | 512 | 20 | 3.582 | 0.184535 | 33.21622 | 7 |
| 4 | 86 | 1 | 0.582 | 0.029983 | 5.39694 | 1 |
| 5 | 50 | 2 | 0.811 | 0.04178 | 7.520478 | 2 |
| 6 | 462 | 6 | 2.252 | 0.116017 | 20.883 | 4 |
| 7 | 232 | 12 | 2.635 | 0.135748 | 24.4346 | 5 |
| 8 | 300 | 17 | 3.109 | 0.160167 | 28.83004 | 6 |
| 9 | 66 | 3 | 1.095 | 0.056411 | 10.15404 | 2 |
| 10 | 317 | 8 | 2.387 | 0.122972 | 22.13487 | 4 |
| 11 | 15 | 1 | 0.354 | 0.018237 | 3.282675 | 1 |
| TOTAL | 2234 | 78 | 19.41167 | 1 | 180 | 36 |

METHOD AND APPARATUS FOR GENERATING DATA REPRESENTING DIGESTS OF PICTURES

This is a continuation of U.S. application Ser. No. 12/232, 216 having a filing date of Sep. 12, 2008.

BACKGROUND OF THE INVENTION

1. Field of the Invention

This invention relates to a method and an apparatus for extracting portions of video data pieces to generate data representing digests of original pictures.

2. Description of the Related Art

Japanese patent application publication number 2005-252372 discloses a method and an apparatus for generating data representing a digest of original pictures. In the method and the apparatus of Japanese application 2005-252372, source video data is periodically sampled at prescribed time intervals to derive successive frames. The derived successive frames are analyzed to detect the moments of the start of every cutting, telop, and camerawork as special-technique starting points. The source video data is divided into portions, the boundaries between which coincide with the special-technique starting points respectively. Frames represented by each source video data portion are thinned out or decimated so that the source video data portion will be shortened to a digest video data piece. The rate of the thinning-out or decimating rises as the time length of the source video data portion increases. The resultant digest video data pieces are connected to form data (digest video data) representing a digest of pictures indicated by the source video data.

In the method and the apparatus of Japanese application 2005-252372, the sampling of the source video data to derive the successive frames and the analysis of the derived successive frames to detect the special-technique starting points tend to require a great amount of data processing. Therefore, it usually takes a long time to generate the digest video data.

SUMMARY OF THE INVENTION

It is a first object of this invention to provide an apparatus for generating digest data in a relatively short time and with a relatively small amount of data processing.

It is a second object of this invention to provide a method of generating digest data in a relatively short time and with a relatively small amount of data processing.

A first aspect of this invention provides a digest data generating apparatus comprising a video data storing section for storing video data pieces therein; a grouping section for classifying the video data pieces in the video data storing section into groups according to prescribed rules; a per-group cut number deciding section for deciding a cut number assigned to each of the groups on the basis of the length or lengths of a video data piece or pieces in each of the groups and the number of the video data piece or pieces in each of the groups; a cut extracting section for extracting a cut or cuts from the video data piece or pieces in each of the groups, wherein the number of the extracted cut or cuts is equal to the cut number decided by the per-group cut number deciding section for each of the groups; and a reproduction controlling section for generating digest data from the cuts extracted by the cut extracting section with respect to all the groups.

A second aspect of this invention is based on the first aspect thereof, and provides a digest data generating apparatus wherein the grouping section comprises means for classifying the video data pieces into the groups according to intervals in shooting date and time between the video data pieces.

A third aspect of this invention is based on the first aspect thereof, and provides a digest data generating apparatus wherein the cut extracting section comprises means for deciding whether or not at least one of the video data pieces in each of the groups has a length shorter than a cut length; means for, when at least one of the video data pieces in at least one of the groups has a length shorter than the cut length, using the whole of said at least one of the video data pieces as a corresponding extracted cut; and means for, when at least one of the video data pieces in at least one of the groups has a length shorter than the cut length, distributing the quantity of the cut length minus the length of said at least one of the video data pieces to the lengths of cuts extracted from the video data pieces in said at least one of the groups and other than said at least one of the video data pieces.

A fourth aspect of this invention is based on the first aspect thereof, and provides a digest data generating apparatus wherein the per-group cut number deciding section comprises means for limiting each of the decided cut numbers to the number of a video data piece or pieces in the corresponding group or less.

A fifth aspect of this invention provides a method of generating digest data. The method comprises the steps of classifying the video data pieces into groups according to prescribed rules; deciding a cut number assigned to each of the groups on the basis of the length or lengths of a video data piece or pieces in each of the groups and the number of the video data piece or pieces in each of the groups; extracting a cut or cuts from the video data piece or pieces in each of the groups, wherein the number of the extracted cut or cuts is equal to the cut number decided for each of the groups; and generating digest data from the extracted cuts with respect to all the groups.

A sixth aspect of this invention provides a digest data generating apparatus comprising first means for classifying video data pieces into groups; second means for detecting a total play time of a video data piece or pieces in each of the groups; third means for detecting the number of the video data piece or pieces in each of the groups; fourth means for deciding a cut number assigned to each of the groups on the basis of the corresponding total play time detected by the second means and the corresponding number detected by the third means; fifth means for extracting a cut or cuts from the video data piece or pieces in each of the groups, wherein the number of the extracted cut or cuts is equal to the corresponding cut number decided by the fourth means; and sixth means for generating digest data from the cuts extracted by the fifth means with respect to all the groups.

A seventh aspect of this invention is based on the sixth aspect thereof, and provides a digest data generating apparatus further comprising seventh means for detecting a total play time of the video data pieces in all the groups; and eighth means provided in the fourth means for deciding a cut number assigned to each of the groups on the basis of the corresponding total play time detected by the second means, the corresponding number detected by the third means, and the total play time detected by the seventh means.

This invention has the following advantage. A cut or cuts are extracted from a video data piece or pieces in each of groups without analyzing the picture contents of the video data piece of pieces. Digest data is generated from the extracted cuts for all the groups. Accordingly, the analysis of the picture contents of the video data pieces is absent from the generation of the digest data. Therefore, it is possible to generate the digest data in a relatively short time and with a relatively small amount of data processing. This results in power economy that is important especially when a battery is used as a main power supply.

BRIEF DESCRIPTION OF THE DRAWINGS

FIG. 2 is a diagram showing an example of the values of various parameters assigned to groups of video data pieces.

DETAILED DESCRIPTION OF THE INVENTION

First Embodiment

Each video data piece represents pictures taken by, for example, a video camera during every shooting. Each video data piece may have sound-representing components and other-information-representing components in addition to picture-representing components. The pictures represented by each video data piece are moving pictures, still pictures, or a mixture of moving pictures and still pictures. Each video data piece is a coded video data sequence, a coded video data block, or a coded video data file.

Each digest data piece corresponds to one or more video data pieces. Each digest data piece represents a digest of pictures represented by the corresponding video data piece or pieces. Each digest data piece may have sound-representing components and other-information-representing components in addition to picture-representing components. The picture digest represented by each digest data piece means a digest of moving pictures, a digest of still pictures, or a digest of a mixture of moving pictures and still pictures. Each digest data piece is a coded digest data sequence, a coded digest data block, or a coded digest data file.

Figure 1:
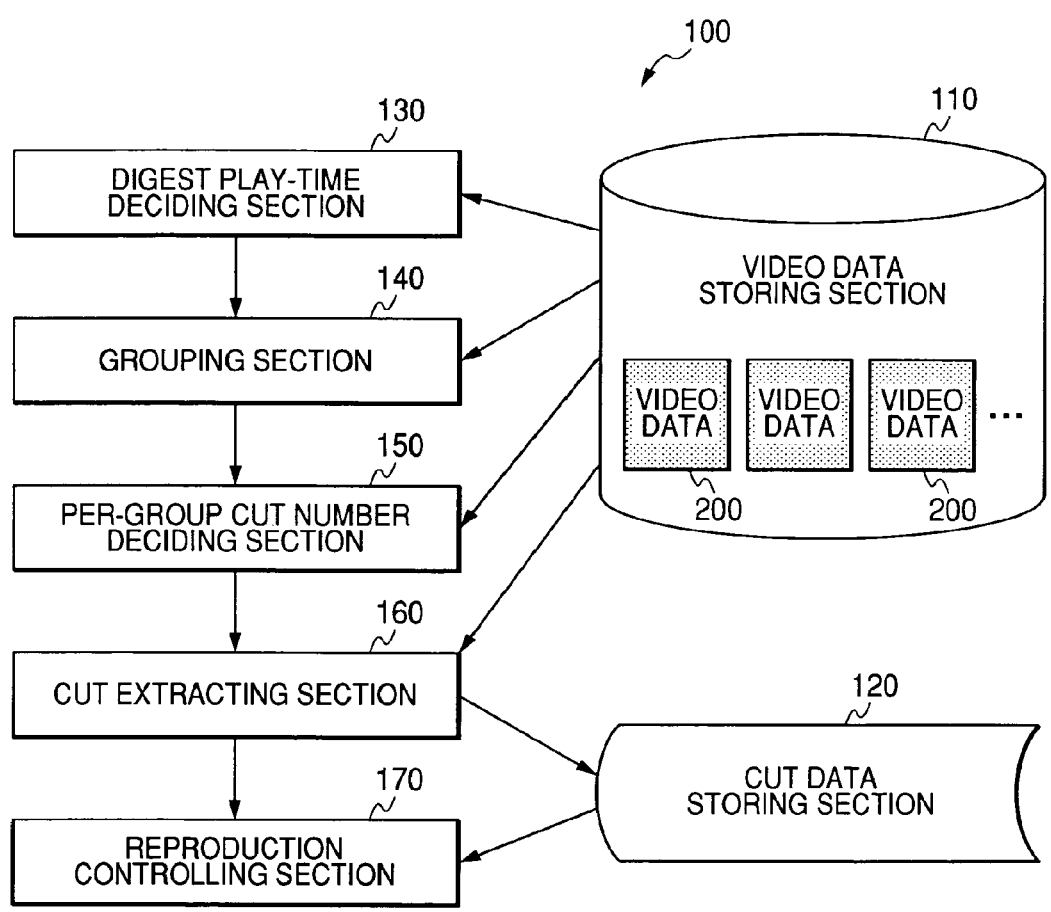
FIG. 1 is a diagram of a digest data generating apparatus according to a first embodiment of this invention.

FIG. 1 shows a digest data generating apparatus 100 according to a first embodiment of this invention. It should be noted that a portion of FIG. 1 shows the operation of the apparatus 100 rather than the hardware structure thereof. The apparatus 100 may be provided in a video camera.

With reference to FIG. 1, there are a video data storing section 110, a cut data storing section 120, a digest play-time deciding section 130, a grouping section 140, a per-group cut number deciding section 150, a cut extracting section 160, and a reproduction controlling section 170 in the digest data generating apparatus 100.

The reproduction controlling section 170 may be omitted from the apparatus 100 or be outside the apparatus 100. The digest play-time deciding section 130 may be omitted from the apparatus 100.

There is an image capturing section or a camera section (not shown in FIG. 1). During every shooting, the camera section repetitively captures an image of a subject or a target scene, and generates a video signal representing a stream of moving pictures or a set of still pictures formed by the respective captured images.

Video signals generated by the camera section are encoded into video data pieces 200. The video data pieces 200 are stored in the video data storing section 110. Each video data piece 200 may contain sound data and text data. Different IDs are assigned to the video data pieces 200, respectively. Each video data piece 200 may contain a signal representing its ID. The video data storing section 110 includes a recording medium and a drive for recording or writing data on the recording medium and reproducing or reading data therefrom. The video data pieces 200 are stored in the recording medium. The recording medium is a hard disc, a DVD, another optical disc, a magnetic tape, or a semiconductor memory. The recording medium is of a removable type or a built-in type (an unremovable type).

Digest data pieces and various information pieces about the digest data pieces are stored in the cut data storing section 120. Each digest data piece is formed by a cut of a corresponding video data piece or pieces. Accordingly, each digest data piece represents a digest of pictures represented by the corresponding video data piece or pieces. The cut data storing section 120 includes a recording medium and a drive for recording or writing data on the recording medium and reproducing or reading data therefrom. The digest data pieces and the various information pieces about the digest data pieces are stored in the recording medium. The recording medium is a hard disc, a DVD, another optical disc, a magnetic tape, or a semiconductor memory. The recording medium is of a removable type or a built-in type (an unremovable type).

The video data storing section 110 and the cut data storing section 120 may be formed by a common data storing section.

The digest data generating apparatus 100 includes a clock, a GPS receiver, and an operation unit (not shown in FIG. 1). The operation unit can be actuated by a user. A signal representing user's comment and a signal representing user's command can be inputted into the apparatus 100 by actuating the operation unit. For each video data piece 200 generated from a video signal outputted by the camera section, the apparatus 100 generates an attribute information piece in response to signals generated by the clock and the GPS receiver and a user's comment signal inputted via the operation unit. The attribute information piece indicates the ID, the shooting date and time, the play time, the shooting place, and the user's comment about the corresponding video data piece 200.

Preferably, the apparatus 100 adds the generated attribute information pieces to the corresponding video data pieces 200 respectively. The apparatus 100 stores the attribute-information-added video data pieces 200 in the video data storing section 110.

Preferably, each video data piece 200 is in a prescribed format (for example, MPEG) having a header portion or an index portion. In this case, an attribute information piece is placed in the header portion or the index portion of the corresponding video data piece 200 according to the prescribed format or management rules prescribed in the apparatus 100.

Alternatively, the apparatus 100 may generate management information files separate from the video data pieces 200. The generated management information files are associated with the video data pieces 200, respectively. In this case, the apparatus 100 places the generated attribute information pieces in the corresponding management information files respectively. Then, the apparatus 100 stores the management information files in the video data storing section 110.

The digest play-time deciding section 130 decides a digest play time T equal to the play time of digest data to be generated and reproduced. The digest play time T is proportional to the sum of the play times of all the video data pieces 200, that is, the total play time of all the video data pieces 200. Specifically, the digest play-time deciding section 130 accesses the attribute information pieces in the video data storing section 110 to detect the play times of the video data pieces 200 therein. Then, the digest play-time deciding section 130 sums the detected play times to calculate the total play time. Subsequently, the digest play-time deciding section 130 decides the digest play time T on the basis of the calculated total play time according to a predetermined proportional function. The digest play-time deciding section 130 informs the per-group cut number deciding section 150 of the decided digest play time T.

The digest play-time deciding section 130 may preset a threshold value for the digest play time T. In this case, the digest play-time deciding section 130 limits the decided digest play time T to the threshold value. The limitation of the digest play time T prevents the impairment of the digest effect, that is, the quick viewing of the video contents in the video data storing section 110.

It should be noted that the digest play time T may be equal to a predetermined value. Alternatively, a signal of the digest play time T may be inputted into the apparatus 100 via the operation unit. In these cases, the digest play-time deciding section 130 is omitted from the apparatus 100.

The grouping section 140 accesses the attribute information pieces in the video data storing section 110 to detect the shooting date and time of each of the video data pieces 200 therein. The grouping section 140 classifies the video data pieces 200 into groups according to prescribed rules using the detected shooting date and time of each of the video data pieces 200.

A first example of the prescribed grouping rules is designed to implement the following action. The grouping section 140 calculates the intervals in shooting date and time between the video data pieces 200. Then, the grouping section 140 compares each of the intervals in shooting or recording date and time between the video data pieces 200 with a prescribed threshold value, and implements the grouping of the video data pieces 200 in accordance with the comparison results. Specifically, two temporally neighboring video data pieces are classified into a same group provided that the interval in shooting date and time between them is equal to or less than the prescribed threshold value. On the other hand, two temporally neighboring video data pieces are separated into different groups respectively provided that the interval in shooting date and time between them is greater than the prescribed threshold value.

A second example of the prescribed grouping rules is designed to implement the following action. The grouping section 140 derives the shooting order numbers of the video data pieces 200 by referring to the shooting date and time of each of the video data pieces 200. The grouping section 140 further accesses the attribute information pieces in the video data storing section 110 to detect the shooting places of the video data pieces 200 therein. The grouping section 140 classify video data pieces 200 into a same group provided that the shooting order numbers thereof are serial and the shooting places thereof are close to each other. On the other hand, the grouping section 140 separate video data pieces 200 into different groups respectively provided that the above-indicated conditions are not met.

The grouping section 140 generates grouping information representing the results of the grouping of the video data pieces 200 in the video data storing section 110. The grouping information has segments representing which of the groups each of the video data pieces 200 belongs to. The grouping section 140 assigns serial ID numbers to the groups, respectively. The grouping information includes segments representing the ID numbers for the groups. The grouping section 140 informs the per-group cut number deciding section 150 and the cut extracting section 160 of the grouping information.

For example, the grouping information indicates lists for the respective groups. Each of the lists has the ID number of the corresponding group, and the IDs of video data pieces 200 therein.

The per-group cut number deciding section 150 detects the groups from the grouping information generated by the grouping section 140. By referring to the grouping information, the per-group cut number deciding section 150 detects the number of a video data piece or pieces 200 in each of the groups. The per-group cut number deciding section 150 accesses the attribute information pieces in the video data storing section 110 to detect the play times of the video data pieces 200 therein. For each group, the per-group cut number deciding section 150 detects the play time or times of a video data piece or pieces 200 therein. The per-group cut number deciding section 150 decides cut numbers assigned to the groups respectively on the basis of the detected play time or times of a video data piece or pieces 200 in each group, the detected number of the video data piece or pieces 200 in each group, and the digest play time T decided by the digest play-time deciding section 130. Each of the decided cut numbers means the number of a cut or cuts being a portion or portions to be extracted from a video data piece or pieces 200 in the corresponding group. The per-group cut number deciding section 150 informs the cut extracting section 160 of the decided cut numbers assigned to the respective groups. As will be explained later, the cuts (the portions) extracted from the video data pieces 200 in the groups are sequentially connected in the order of shooting date and time to form digest data.

Detailed operation of the per-group cut number deciding section 150 is as follows. It is assumed that the grouping section 140 classifies the video data pieces 200 into "g" groups (a group "1", a group "2", ..., a group "g"). Firstly, the per-group cut number deciding section 150 detects the number of a video data piece or pieces in each of the "g" groups. Furthermore, the per-group cut number deciding section 150 computes the total play time of the video data piece or pieces in each of the "g" groups. In the case of a group having only a single video data piece, the per-group cut number deciding section 150 uses the play time of the video data piece as the total play time. In the case of a group having two or more video data pieces, the per-group cut number deciding section 150 sums the play times of the respective video data pieces to compute the total play time. Thereafter, the per-group cut number deciding section 150 calculates a cut ratio P(n) for a group "n" (n=1, 2, ..., g) according to the following equation.

$$P(n) = \frac{\log(L(n)) \cdot \log(N(n)+1)}{\sum_{i=1}^{g} \{\log(L(i)) \cdot \log(N(i)+1)\}} \quad (1)$$

where L(n) denotes the total play time of a video data piece or pieces in the group "n"; N(n) denotes the number of the video data piece or pieces in the group "n"; L(i) denotes the total play time of a video data piece or pieces in a group "i"; and N(i) denotes the number of the video data piece or pieces in the group "i".

The per-group cut number deciding section 150 is informed of the digest play time T by the digest play-time deciding section 130. The per-group cut number deciding section 150 computes a partial digest play time D(n) for the group "n" from the digest play time T and the calculated cut ratio P(n) according to the following equation.

$$D(n) = T \cdot P(n) \quad (2)$$

Thereafter, the per-group cut number deciding section 150 calculates a basic number CB(n) for the group "n" from the computed partial digest play time D(n) and a cut time length "t" according to the following equation.

$$CB(n) = \begin{cases} 1 & (D(n)/t < 0.5) \\ D(n)/t & (D(n)/t \geq 0.5) \end{cases} \quad (3)$$

where the cut time length "t" means the play time of each cut to be extracted. Preferably, the cut time length "t" is chosen to be proportional to the sum of the play times of all the video data pieces or the digest play time T. Alternatively, the cut time length "t" may be determined by using another parameter. The cut length "t" may be equal to a predetermined value.

The per-group cut number deciding section 150 computes a cut number C(n) for the group "n" by rounding the calculated basic number CB(n) to the nearest integer.

With reference to FIG. 2, there are 11 groups having ID numbers of "1", "2", ..., and "11" respectively. Under the conditions of FIG. 2, the digest play time T decided by, for example, the digest play-time deciding section 130 is equal to 180 seconds while the cut time length "t" is equal to 5 seconds. The per-group cut number deciding section 150 detects the number of a video data piece or pieces in each of the 11 groups. Furthermore, the per-group cut number deciding section 150 computes the total play time of the video data piece or pieces in each of the 11 groups. Subsequently, the per-group cut number deciding section 150 calculates the value of log(L(k))·log(N(k)+1), where "k" denotes a group ID number varying from "1" to "11", and L(k) denotes the total play time of a video data piece or pieces in the group "k" and N(k) denotes the number of the video data piece or pieces in the group "k". Thereafter, the per-group cut number deciding section 150 computes the cut ratio P(n) for each of the 11 groups. Subsequently, the per-group cut number deciding section 150 calculates the partial digest play time D(n) and the cut number C(n) for each of the 11 groups.

In FIG. 2, a cut number C(n) of "1" is assigned to the group having the ID number "1". Furthermore, a cut number C(n) of "3" is assigned to the group having the ID number "2". In addition, a cut number C(n) of "7" is assigned to the group having the ID number "3". The 11 groups are assigned 36 cuts in total.

Each of the cut numbers C(n) for the respective groups may be decided on the basis of the total play time of a video data piece or pieces in the corresponding group, the number of the video data piece or pieces in the corresponding group, and the digest play time T according to predetermined equations different from the previously-indicated equations (1), (2), and (3).

The cut extracting section 160 is informed of the decided cut numbers C(n) for the respective groups by the per-group cut number deciding section 150. Furthermore, the cut extracting section 160 is informed of the cut time length "t" by the per-group cut number deciding section 150. In addition, the cut extracting section 160 is informed of the grouping information by the grouping section 140. The cut extracting section 160 accesses the video data storing section 110 and extracts a cut or cuts (a portion or portions) from a video data piece or pieces in each group, wherein the number of the extracted cut or cuts is equal to the corresponding cut number C(n), and the play time of each extracted cut is equal to the cut time length "t". Detailed operation of the cut extracting section 160 is as follows.

Figure 3:
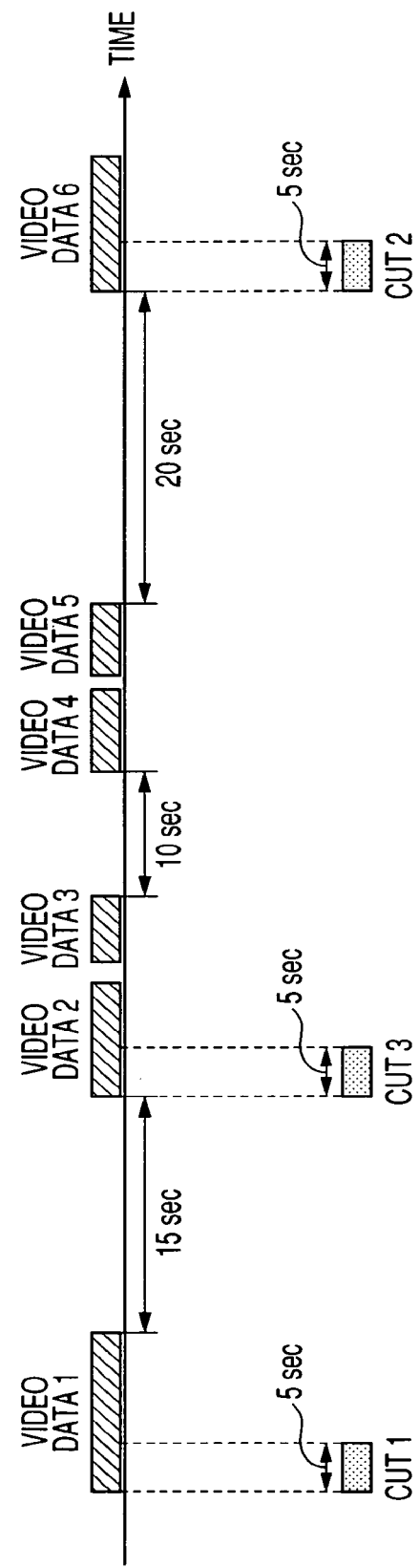
FIG. 3 is a time-domain diagram of an example of video data pieces in a group, and cuts extracted therefrom.

With reference to FIG. 3, there are 6 video data pieces (video data pieces "1", "2", "3", "4", "5", and "6") in a group assigned a cut number C(n) of "3". The 6 video data pieces are successively arranged in the order of shooting date and time. Under the conditions of FIG. 3, the cut time length "t" is equal to 5 seconds. The cut extracting section 160 accesses the video data storing section 110, and extracts a 5-second head portion from the first one (the video data piece "1") among the 6 video data pieces as a cut "1". The cut extracting section 160 accesses the attribute information pieces in the video data storing section 110 to detect the shooting date and time of each of the 6 video data pieces. Then, the cut extracting section 160 calculates the intervals in shooting date and time between the 6 video data pieces. Subsequently, the cut extracting section 160 compares the calculated intervals with each other and virtually arranges them according to length. The cut extracting section 160 selects, from the virtually arranged intervals, longer ones whose number is equal to the cut number C(n) minus "1". The cut extracting section 160 accesses the video data storing section 110, and sequentially extracts 5-second head portions from the video data pieces immediately following the selected longer intervals as cuts later than the cut "1". In FIG. 3, the interval between the video data pieces "5" and "6" is the longest, and the interval between the video data pieces "1" and "2" is the second longest. Accordingly, the cut extracting section 160 extracts a 5-second head portion from the video data piece "6" as a cut "2". Then, the cut extracting section 160 extracts a 5-second head portion from the video data piece "2" as a cut "3".

The above-mentioned operation of the cut extracting section 160 is equivalent to the following operation. For each group, the cut extracting section 160 calculates the intervals in shooting date and time between in-group video data pieces. For each group, the cut extracting section 160 further classifies the in-group video data pieces into sub groups, the number of which is equal to the corresponding cut number C(n), according to the calculated intervals. The cut extracting section 160 extracts a 5-second head portion from the first video data piece in each of the sub groups as a cut.

Alternatively, the cut extracting section 160 may operate as follows. For each group, the cut extracting section 160 calculates the intervals in shooting date and time between in-group video data pieces. Then, the cut extracting section 160 compares the calculated intervals and virtually arranges them according to length. The cut extracting section 160 selects, from the virtually arranged intervals, longer ones whose number is equal to the corresponding cut number C(n) minus "1". The cut extracting section 160 classifies the in-group video data pieces into sub groups in a manner such that time ranges separated by the selected longer intervals correspond to the sub groups respectively, and that a video data piece or pieces placed in each of the time ranges are labeled as a member or members of the corresponding sub group. The cut extracting section 160 extracts a 5-second head portion from the first video data piece in each of the sub groups as a cut. In FIG. 3, the interval between the video data pieces "1" and "2", and the interval between the video data pieces "5" and "6" are selected longer ones. Accordingly, the video data piece "1" is separated into a first sub group. The video data pieces "2", "3", "4", and "5" are separated into a second sub group. The video data piece "6" is separated into a third sub group. In this case, the video data pieces "1", "2", and "6" are the first video data pieces in the first, second, and third groups. Thus, the cut extracting section 160 extracts 5-second head portions from the video data pieces "1", "2", and "6" as cuts "1", "2", and "3".

As previously mentioned, the cut extracting section 160 accesses the video data storing section 110 and extracts a cut or cuts (a portion or portions) from a video data piece or pieces in each group, wherein the number of the extracted cut or cuts is equal to the corresponding cut number C(n), and the play time of each extracted cut is equal to the cut time length "t". The cut extracting section 160 stores the extracted cuts (the extracted portions) in the cut data storing section 120 as digest data pieces for all the groups.

The cut extracting section 160 may generate a playlist and store the generated playlist in the cut data storing section 120 or the video data storing section 110. In this case, the cut extracting section 160 detects the IDs of the video data pieces from which the cuts should be extracted respectively, and the positions in the video data pieces at which the cuts should be extracted respectively. The cut extracting section 160 combines information representative of the detected IDs of the video data pieces and information representative of the detected positions therein to generate the playlist.

The digest data generating apparatus 100 includes a display (not shown in FIG. 1). When user's command to reproduce digest data is inputted into the apparatus 100 via the operation unit, the reproduction controlling section 170 sequentially transfers the digest data pieces from the cut data storing section 120 to the display in the order of shooting date and time. The reproduction controlling section 170 controls the display to sequentially visualize or reproduce the contents of the transferred digest data pieces. In other words, the reproduction controlling section 170 sequentially connects the digest data pieces to form digest data, and controls the display to reproduce the contents of the digest data.

In the case where the playlist is generated and stored, the reproduction controlling section 170 accesses the video data storing section 110 to detect the to-be-extracted portions of the video data pieces according to the playlist. In this case, the reproduction controlling section 170 sequentially transfers the detected portions of the video data pieces from the video data storing section 110 to the display in the order of shooting date and time. The reproduction controlling section 170 controls the display to sequentially visualize or reproduce the contents of the transferred portions of the video data pieces. In other words, the reproduction controlling section 170 sequentially connects the detected portions of the video data pieces to form digest data, and controls the display to reproduce the contents of the digest data.

As previously mentioned, the grouping section 140 classifies the video data pieces 200 in the video data storing section 110 into groups according to the prescribed rules. The per-group cut number deciding section 150 decides cut numbers assigned to the groups respectively on the basis of the play time or times of a video data piece or pieces 200 in each group, the number of the video data piece or pieces 200 in each group, and the digest play time T decided by the digest play-time deciding section 130. The cut extracting section 160 extracts a cut or cuts (a portion or portions) from a video data piece or pieces in each group without analyzing the picture contents of the video data piece or pieces, wherein the number of the extracted cut or cuts is equal to the corresponding cut number. The cut extracting section 160 stores the extracted cuts (the extracted portions) in the cut data storing section 120 as digest data pieces for all the groups. Accordingly, the analysis of the picture contents of the video data pieces is absent from the generation of digest data. Therefore, it is possible to generate digest data in a relatively short time and with a relatively small amount of data processing. This causes power economy that is important especially when the digest data generating apparatus 100 is incorporated in a battery-powered video camera.

Figure 4:
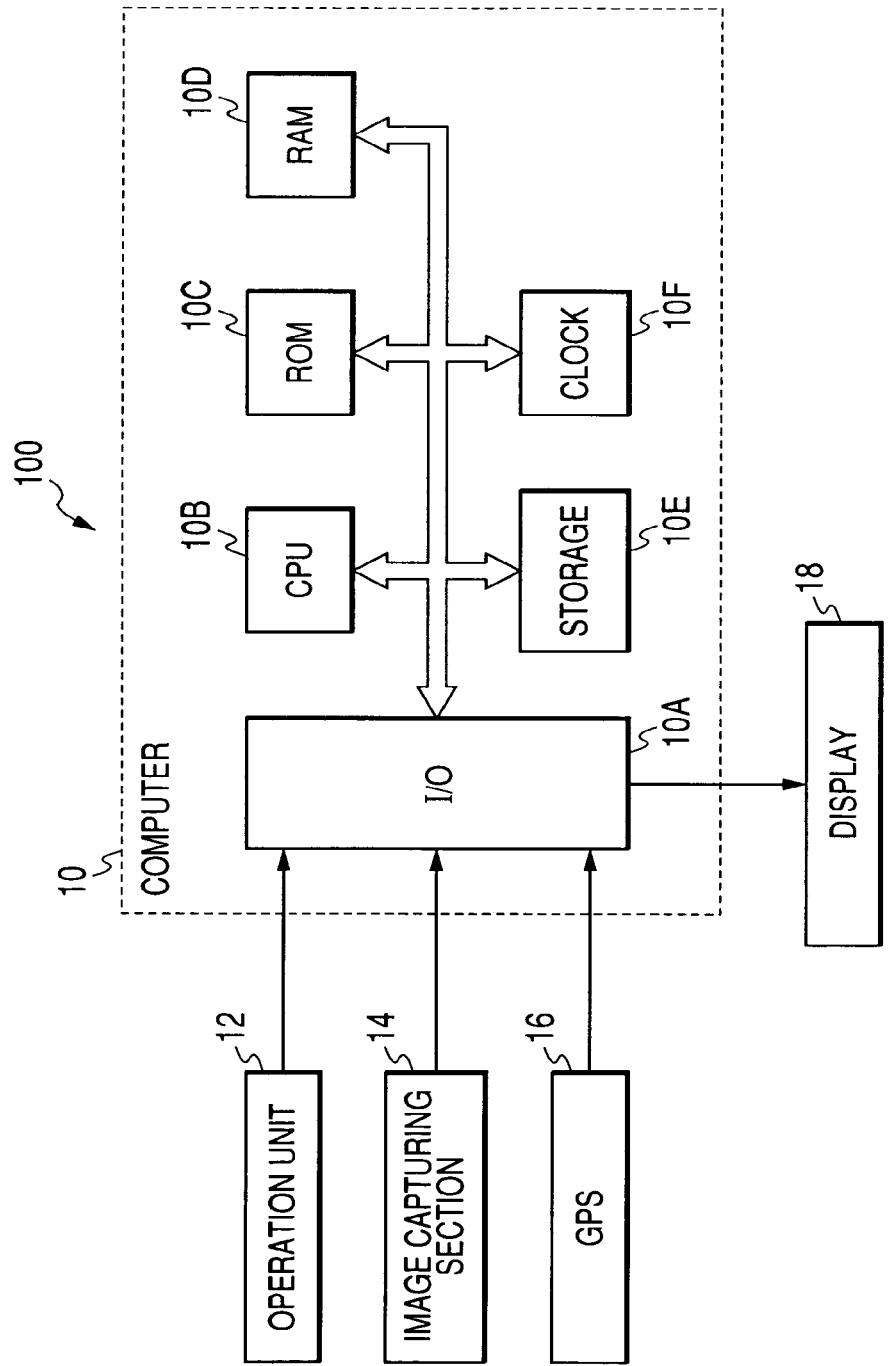
FIG. 4 is a block diagram of the digest data generating apparatus in the first embodiment of this invention.

FIG. 4 shows the hardware structure of the digest data generating apparatus 100. As shown in FIG. 4, the apparatus 100 includes a computer 10. The digest play-time deciding section 130, the grouping section 140, the per-group cut number deciding section 150, the cut extracting section 160, and the reproduction controlling section 170 in FIG. 1 are implemented by the computer 10.

The computer 10 has an I/O port 10A, a CPU 10B, a ROM 10C, a RAM 10D, a storage unit 10E, and a clock 10F which are connected by a bus. Preferably, the storage unit 10E includes a memory, a combination of a hard disc and a drive therefor, or a combination of a writable optical disc and a drive therefor. The clock 10F generates a signal representing the present date and time. The clock 10F outputs the generated signal to the CPU 10B.

The apparatus 100 includes an operation unit 12 connected with the I/O port 10A of the computer 10. The operation unit 12 can be actuated by a user. A signal representing user's comment and a signal representing user's command can be inputted into the computer 10 by actuating the operation unit 12.

The apparatus 100 includes an image capturing section (a camera section) 14 connected with the I/O port 10A of the computer 10. During every shooting, the image capturing section 14 repetitively captures an image of a subject or a target scene, and generates a video signal representing a stream of moving pictures or a set of still pictures formed by the respective captured images. The image capturing section 14 outputs each video signal to the I/O port 10A of the computer 10.

The apparatus 100 includes a GPS receiver 16 connected with the I/O port 10A of the computer 10. The GPS receiver 16 generates a signal representing the present position of the apparatus 100. The GPS receiver 16 outputs the generated signal to the I/O port 10A of the computer 10.

The apparatus 100 includes a display 18 connected with the I/O port 10A of the computer 10. The display 18 visualizes the contents of a video signal fed from the I/O port 10A while being controlled by the computer 10.

The computer 10 or the CPU 10B operates in accordance with a control program (a computer program) stored in the ROM 10C, the RAM 10D, or the storage unit 10E. The control program is designed to enable the computer 10 or the CPU 10B to implement actions mentioned hereafter.

During a data recording mode of operation of the apparatus 100, the computer 10 receives a video signal from the image capturing section 14. The computer 10 encodes the received video signal into a video data piece, and stores the video data piece into the storage unit 10E. For the stored video data piece, the computer 10 obtains or generates an attribute data piece in response to the signals generated by the clock 10F and the GPS receiver 16, and a user's comment signal inputted via the operation unit 12. The attribute information piece indicates the ID, the shooting date and time, the play time, the shooting place, and the user's comment about the video data piece. The computer 10 stores the attribute information piece into the storage unit 10E in a manner such as to relate the stored attribute information piece with the stored video data piece.

After the apparatus 100 has been repetitively operated in the data recording mode, video data pieces and attribute information pieces for the respective video data pieces are stored in the storage unit 10E. The video data storing section 110 and the cut data storing section 120 in FIG. 1 are implemented by the storage unit 10E.

Figure 5:
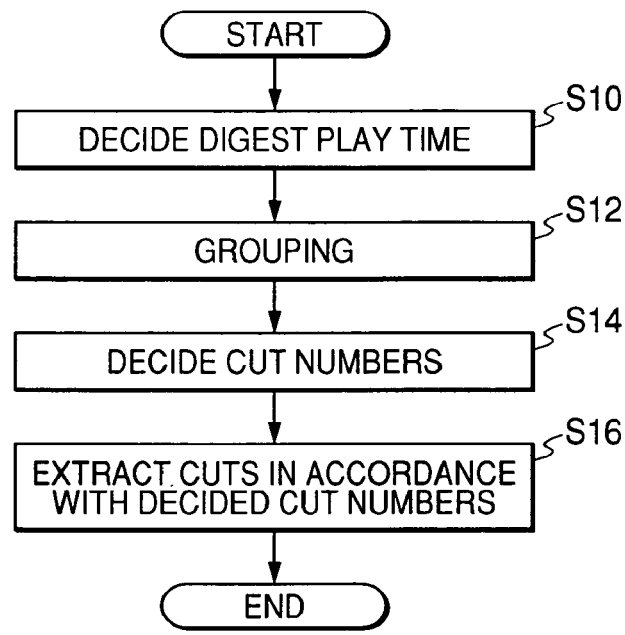
FIG. 5 is a flowchart of a first segment of a control program for a computer in FIG. 4.

The apparatus 100 can be operated in a digest generating mode. FIG. 5 is a flowchart of a segment of the control program for the computer 10 (the CPU 10B) which relates to the digest generating mode of operation.

With reference to FIG. 5, a first step S10 of the program segment accesses attribute information pieces in the storage unit 10E to detect the play times of all video data pieces therein. Then, the step S10 sums the detected play times to calculate the total play time. Subsequently, the step S10 decides a digest play time T which is proportional to the calculated total play time. The step S10 corresponds to the digest play-time deciding section 130 in FIG. 1.

A step S12 following the step S10 accesses the attribute information pieces in the storage unit 10E to detect the shooting date and time of each of all the video data pieces therein. The step S12 classifies all the video data pieces into groups according to prescribed rules using the detected shooting date and time of each of the video data pieces as the grouping section 140 in FIG. 1 does. The step S12 generates grouping information as the grouping section 140 does. The step S12 stores the generated grouping information into the storage unit 10E.

A step S14 subsequent to the step S12 refers to the grouping information, and thereby detects the number of a video data piece or pieces in each of the groups. The step S14 accesses the attribute information pieces in the storage unit 10E to detect the play times of all the video data pieces therein. For each group, the step S14 detects the play time or times of a video data piece or pieces therein. The step S14 decides cut numbers assigned to the groups respectively on the basis of the detected play time or times of the video data piece or pieces in each group, the detected number of the video data piece or pieces in each group, and the digest play time T as the per-group cut number deciding section 150 in FIG. 1 does. The step S14 determines or provides a cut time length "t" as the per-group cut number deciding section 150 in FIG. 1 does.

A step S16 following the step S14 accesses the storage unit 10E and extracts a cut or cuts (a portion or portions) from a video data piece or pieces in each group, wherein the number of the extracted cut or cuts is equal to the corresponding cut number, and the play time of each extracted cut is equal to the cut time length "t". The group-dependent extraction of cuts from the video data pieces by the step S16 is similar to that by the cut extracting section 160 in FIG. 1. The step S16 stores the extracted cuts (the extracted portions) into the storage unit 10E as digest data pieces. By referring to the attribute information pieces in the storage unit 10E, the step S16 generates cut information pieces representing the shooting dates and times of the cuts and the IDs of the cuts. The step S16 stores the cut information pieces into the storage unit 10E in a manner as to relate the cut information pieces with the cuts. After the step S16, the current execution cycle of the program segment ends.

Figure 6:
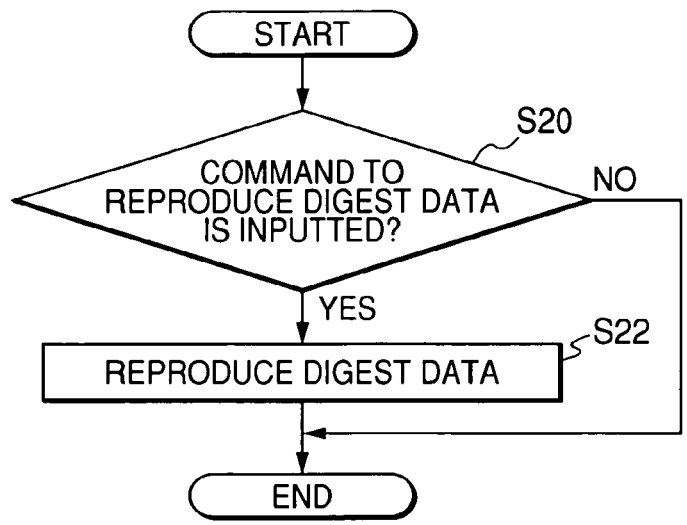
FIG. 6 is a flowchart of a second segment of the control program for the computer in FIG. 4.

The apparatus 100 can be operated in a digest reproducing mode. FIG. 6 is a flowchart of a segment of the control program for the computer 10 (the CPU 10B) which relates to the digest reproducing mode of operation. The program segment in FIG. 6 is repetitively executed.

As shown in FIG. 6, a first step S20 of the program segment decides whether or not user's command to reproduce digest data is inputted from the operation unit 12. When user's command is inputted, the program advances from the step S20 to a step S22. Otherwise, the program exits from the step S20, and then the current execution cycle of the program segment ends.

The step S22 refers to cut information pieces in the storage unit 10E. According to the cut information pieces, the step S22 sequentially transfers digest data pieces from the storage unit 10E to the display 18 in the order of shooting date and time. The step S22 controls the display 18 to sequentially visualize or reproduce the contents of the transferred digest data pieces. In other words, the step S22 sequentially connects the digest data pieces to form digest data, and controls the display 18 to reproduce the contents of the digest data. After the step S22, the current execution cycle of the program segment ends.

Second Embodiment

A second embodiment of this invention is similar to the first embodiment thereof except for design changes mentioned hereafter.

Figure 7:
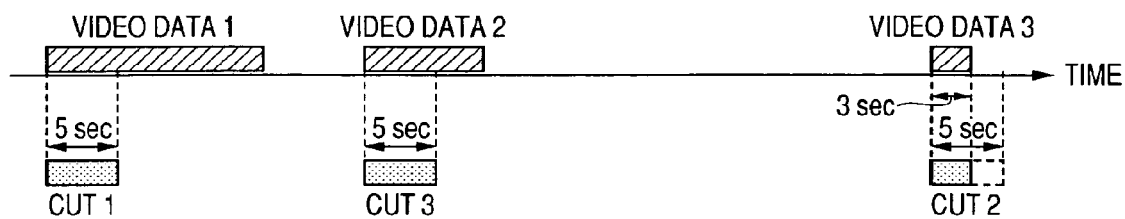
FIG. 7 is a time-domain diagram of an example of video data pieces in a group, and cuts extracted therefrom.

With reference to FIG. 7, there is a group having video data pieces "1", "2", and "3". Cuts "1", "2", and "3" are to be extracted from the video data pieces "1", "3", and "2", respectively. Since the play time of the video data piece "3" is equal to 3 seconds, a 5-second head portion can not be extracted from the video data piece "3" as a cut "2".

If a fourth video data piece differing from the video data pieces "1", "2", and "3" and having a play time of 5 seconds or longer is also in the group, a 5-second head portion may be extracted from the fourth video data piece as a cut "2". In the absence of such a fourth video data piece from the group, the cut extracting section 160 takes one of the following first, second, third, fourth, and fifth actions.

Figure 8:
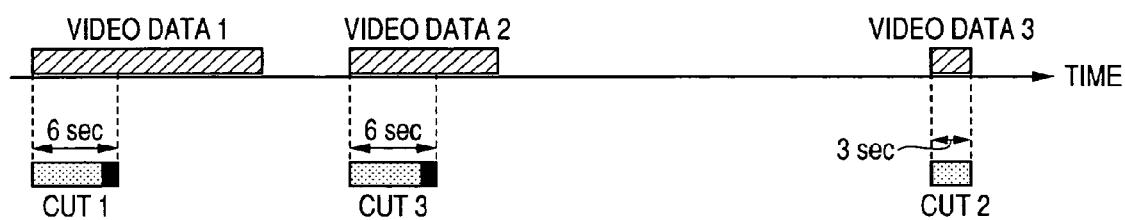
FIG. 8 is a time-domain diagram of an example of video data pieces in a group, and cuts extracted therefrom by a first action taken by a cut extracting section in a second embodiment of this invention.

FIG. 8 relates to the first action in which the whole of the video data piece "3" having a play time of 3 seconds is used as a cut "2", and 6-second head portions are extracted from the video data pieces "1" and "2" as cuts "1" and "3" respectively. Thus, the time length of the cut "2" is equal to 3 seconds, while the time lengths of the cuts "1" and "3" are equal to 6 seconds.

Specifically, the cut extracting section 160 compares the play time of each of the video data pieces "1", "2", and "3" with the cut time length "t" (5 seconds) to detect a short video data piece which means a video data piece having a play time shorter than the cut time length "t". The cut extracting section 160 labels the whole of the short video data piece as a corresponding cut. In FIG. 8, the video data piece "3" is detected as short one (one having a play time shorter than the cut time length "t"), and the cut extracting section 160 labels the whole of the video data piece "3" as a cut "2". The cut extracting section 160 calculates the difference value equal to the cut time length "t" minus the play time of the short video data piece. The cut extraction section 160 divides the calculated difference value by the number of in-group video data pieces different from the short video data piece. The cut extracting section 160 calculates the addition value equal to the cut time length "t" plus the result of the division. The cut extracting section 160 extracts a head portion, which has a play time equal to the calculated addition value, from each of the in-group video data pieces other than the short video data piece to generate a corresponding cut. In FIG. 8, the cut time length "t" is equal to 5 seconds and the play time of the video data piece "3" is equal to 3 seconds, the calculated difference value is equal to 2 seconds. Since the number of in-group video data pieces different from the video data piece "3" is 2, the result of the division is equal to 1 second so that the addition value is equal to 6 seconds. Accordingly, the cut extracting section 160 extracts 6-second head portions from the video data pieces "1" and "2" as cuts "1" and "3" respectively.

Figure 9:
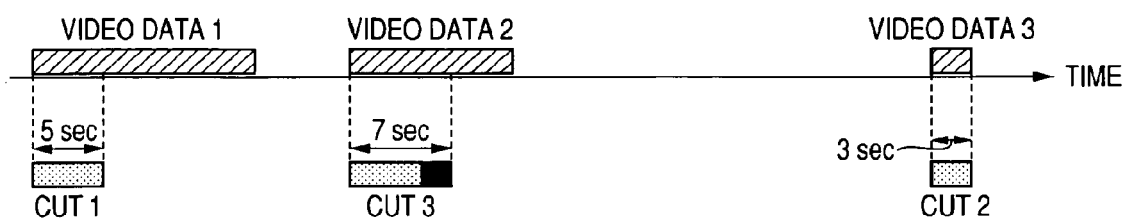
FIG. 9 is a time-domain diagram of an example of video data pieces in a group, and cuts extracted therefrom by a second action taken by the cut extracting section in the second embodiment of this invention.

FIG. 9 relates to the second action in which the whole of the video data piece "3" having a play time of 3 seconds is used as a cut "2", and a 5-second head portion and a 7-second head portion are extracted from the video data pieces "1" and "2" as cuts "1" and "3" respectively. Thus, the time length of the cut "2" is equal to 3 seconds, while the time lengths of the cuts "1" and "3" are equal to 5 seconds and 7 seconds respectively.

Specifically, the cut extracting section 160 compares the play time of the video data piece "1" with the cut time length "t" (5 seconds). When the play time of the video data piece "1" is equal to or longer than the cut time length "t", the cut extracting section 160 extracts a 5-second head portion from the video data piece "1" as a cut "1". Thereafter, the cut extracting section 160 compares the play time of the video data piece "3" with the cut time length "t". When the play time of the video data piece "3" is shorter than the cut time length "t", the cut extracting section 160 labels the whole of the video data piece "3" as a cut "2". The cut extracting section 160 calculates the difference value equal to the cut time length "t" minus the play time of the video data piece "3". Subsequently, the cut extracting section 160 calculates the addition value equal to the cut time length "t" plus the calculated difference value. In FIG. 9, the cut time length "t" is equal to 5 seconds and the play time of the video data piece "3" is equal to 3 seconds, the calculated difference value is equal to 2 seconds. Accordingly, the calculated addition value is equal to 7 seconds. Thereafter, the cut extracting section 160 compares the play time of the video data piece "2" with the calculated addition value. When the play time of the video data piece "2" is equal to or longer than the calculated addition value, the cut extracting section 160 extracts a head portion, which has a play time equal to the addition value, from the video data piece "2" as a cut "3". In FIG. 9, a 7-second head portion is extracted from the video data piece "2" as a cut "3".

According to the third action, the cut extracting section 160 compares the play time of each of the video data pieces "1", "2", and "3" with the cut time length "t" (5 seconds) to detect a short video data piece which means a video data piece having a play time shorter than the cut time length "t". The cut extracting section 160 labels the whole of the short video data piece as a corresponding cut. The cut extracting section 160 calculates the difference value equal to the cut time length "t" minus the play time of the short video data piece. The cut extracting section 160 computes the ratio in play time between first and second in-group video data pieces different from the short video data piece. The cut extraction section 160 divides the calculated difference value into first and second parts at the computed ratio. The cut extracting section 160 extracts a head portion, which has a play time equal to the cut time length "t" plus the first part of the calculated difference value, from the first in-group video data piece to generate a corresponding cut. The cut extracting section 160 extracts a head portion, which has a play time equal to the cut time length "t" plus the second part of the calculated difference value, from the second in-group video data piece to generate a corresponding cut. Thus, the calculated difference value is distributed to cuts from the in-group video data pieces other than the short video data piece in accordance with the ratio in play time between the in-group video data pieces.

According to the fourth action, the cut extracting section 160 compares the play time of each of the video data pieces "1", "2", and "3" with the cut time length "t" (5 seconds) to detect a short video data piece which means a video data piece having a play time shorter than the cut time length "t". The cut extracting section 160 labels the whole of the short video data piece as a corresponding cut. The cut extracting section 160 compares the play times of the video data pieces "1", "2", and "3" with each other to detect the longest video data piece. The cut extracting section 160 calculates the difference value equal to the cut time length "t" minus the play time of the short video data piece. Subsequently, the cut extracting section 160 calculates the addition value equal to the cut time length "t" plus the calculated difference value. The cut extracting section 160 extracts a head portion, which has a play time equal to the calculated addition value, from the longest video data piece as a corresponding cut. The cut extracting section 160 extracts a 5-second head portion from the in-group video data piece different from the short and longest video data pieces as a corresponding cut.

According to the fifth action, the cut extracting section 160 compares the play time of the video data piece "1" with the cut time length "t" (5 seconds). When the play time of the video data piece "1" is equal to or longer than the cut time length "t", the cut extracting section 160 extracts a 5-second head portion from the video data piece "1" as a cut "1". Thereafter, the cut extracting section 160 compares the play time of the video data piece "3" with the cut time length "t". When the play time of the video data piece "3" is shorter than the cut time length "t", the cut extracting section 160 labels the whole of the video data piece "3" as a cut "2". Then, the cut extracting section 160 compares the play time of the video data piece "2" with the cut time length "t". When the play time of the video data piece "2" is equal to or longer than the cut time length "t", the cut extracting section 160 extracts a 5-second head portion from the video data piece "2" as a cut "3".

In this way, the second embodiment of this invention provides a variation in the time lengths of cuts from video data pieces in each group when the play time of one of the video data pieces is shorter than the cut time length "t". The provided variation in the time lengths of the cuts enables the contents of the resultant digest data to be more easily understood by the user.

Third Embodiment

A third embodiment of this invention is similar to the first embodiment thereof except for design changes mentioned hereafter.

Figure 10:
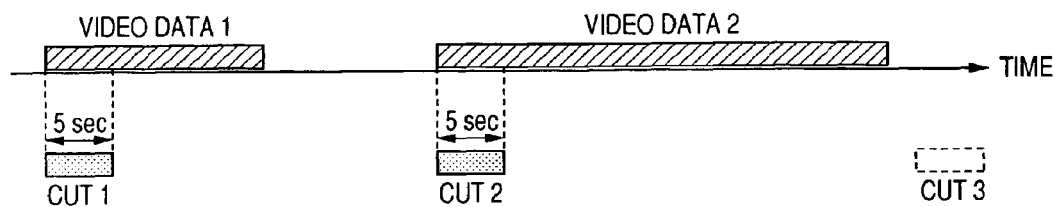
FIG. 10 is a time-domain diagram of an example of video data pieces in a group, and cuts extracted therefrom.

With reference to FIG. 10, there is a group having video data pieces "1" and "2". The cut number assigned to the group is 3. Thus, three 5-second cuts "1", "2", and "3" are to be extracted from the video data pieces "1" and "2". Since only the two video data pieces are in the group, it is difficult to extract three 5-second cuts from the two video data pieces in the first embodiment of this invention.

According to the third embodiment of this invention, two or three cuts are extracted from the two video data pieces in one of the following first, second, third, and fourth ways.

Figure 11:
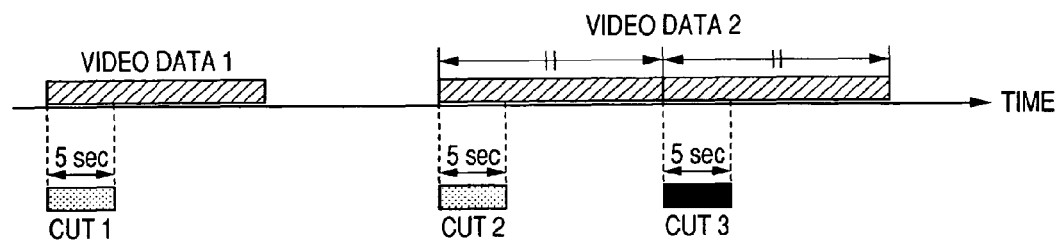
FIG. 11 is a time-domain diagram of an example of video data pieces in a group, and cuts extracted therefrom in a first way according to a third embodiment of this invention.

FIG. 11 relates to the first way in which the cut extracting section 160 compares the number of video data pieces in the group with the cut number assigned thereto, and thereby decides whether or not the video-data-piece number is less than the cut number. When the video-data-piece number is less than the cut number, the cut extracting section 160 compares the play times of the in-group video data pieces with each other to detect the longest video data piece. Then, the cut extracting section 160 extracts 5-second head portions from the in-group video data pieces as cuts, respectively. Furthermore, the cut extracting section 160 extracts a 5-second central portion from the longest video data piece as another cut. In FIG. 11, 5-second head portions are extracted from the video data pieces "1" and "2" as cuts "1" and "2", respectively. Since the video data piece "2" is the longest, a 5-second central portion is extracted therefrom as a cut "3". It should be noted that a 5-second off-center portion may be extracted from the video data piece "2" as a cut "3".

Figure 12:
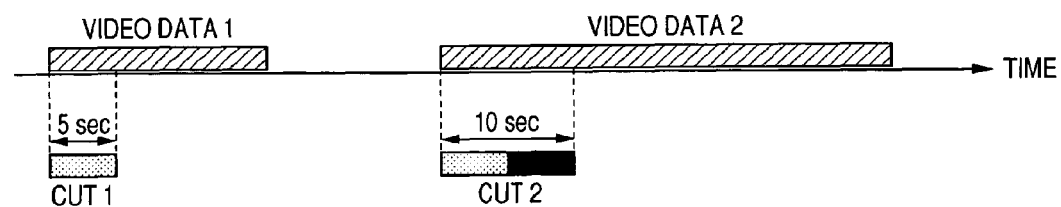
FIG. 12 is a time-domain diagram of an example of video data pieces in a group, and cuts extracted therefrom in a second way according to the third embodiment of this invention.

FIG. 12 relates to the second way in which the cut extracting section 160 compares the number of video data pieces in the group with the cut number assigned thereto, and thereby decides whether or not the video-data-piece number is less than the cut number. When the video-data-piece number is less than the cut number, the cut extracting section 160 compares the play times of the in-group video data pieces with each other to detect the longest video data piece. Then, the cut extracting section 160 extracts a 5-second head portion or portions from the non-longest video data piece or pieces in the group as a cut or cuts. Furthermore, the cut extracting section 160 extracts a 10-second head portion from the longest video data piece as another cut. In FIG. 12, the video data piece "2" is the longest. Accordingly, a 5-second head portion is extracted from the video data piece "1" as a cut "1" while a 10-second head portion is extracted from the video data piece "2" as a cut "2".

Figure 13:
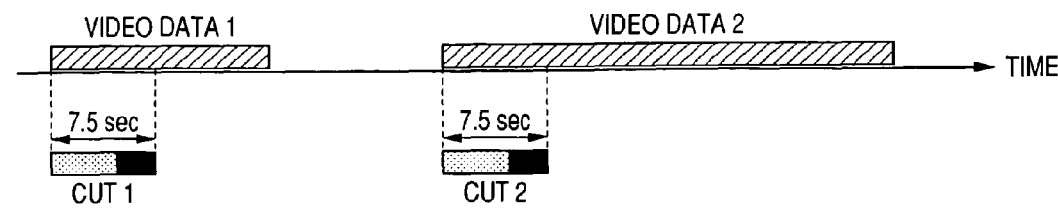
FIG. 13 is a time-domain diagram of an example of video data pieces in a group, and cuts extracted therefrom in a third way according to the third embodiment of this invention.

FIG. 13 relates to the third way in which the cut extracting section 160 compares the number of video data pieces in the group with the cut number assigned thereto, and thereby decides whether or not the video-data-piece number is less than the cut number. When the video-data-piece number is less than the cut number, the cut extracting section 160 subtracts the video-data-piece number from the cut number. Then, the cut extracting section 160 multiplies the cut time length "t" (5 seconds) by the result of the subtraction. Subsequently, the cut extracting section 160 divides the result of the multiplication by the video-data-piece number. The cut extracting section 160 calculates the addition value equal to the cut time length "t" plus the result of the division. The cut extracting section 160 extracts head portions, which have a play time equal to the calculated addition value, from the in-group video data pieces to generate cuts. In FIG. 13, the number of video data pieces in the group is 2 and the cut number assigned thereto is 3, so that the result of the subtraction therebetween is equal to 1. The result of the multiplication between the cut time length "t" (5 seconds) and the subtraction result is equal to 5 seconds. The result of dividing the multiplication result by the video-data-piece number is equal to 2.5 seconds. The addition value, that is, the cut time length "t" plus the division result, is equal to 7.5 seconds. Accordingly, 7.5-second head portions are extracted from the data pieces "1" and "2" as cuts "1" and "2", respectively.

In the fourth way, the cut extracting section 160 compares the number of video data pieces in the group with the cut number assigned thereto, and thereby decides whether or not the video-data-piece number is less than the cut number. When the video-data-piece number is less than the cut number, the cut extracting section 160 extracts 5-second head portions from the in-group video data pieces as cuts, respectively. The cut extracting section 160 does not implement additional cut extraction.

As previously mentioned, in the event that the number of video data pieces in a group is less than the cut number assigned thereto, a cut or cuts are increased in time length. The increase in the cut time length enables the contents of the resultant digest data to be more easily understood by the user.

Fourth Embodiment

A fourth embodiment of this invention is similar to one of the first to third embodiments thereof except that the digest data generating apparatus 100 is provided in a digital still camera, an image file storage apparatus, a personal computer, a recorder apparatus, or another electronic apparatus.

What is claimed is:

1. A digest data generating apparatus, comprising:
a digest time deciding section for deciding a digest time being a play time of digest data on the basis of a total play time of a plurality of original moving picture data pieces;
a grouping section for classifying the original moving picture data pieces into groups according to prescribed rules;
a moving picture data extracting section for extracting digest moving picture data pieces from the original moving picture data pieces on the basis of a total play time of an original moving picture data piece or pieces in each of the groups, the number of the original moving picture data piece or pieces in each of the groups, and the digest time decided by the digest time deciding section; and
a reproduction controlling section performing control for sequentially reproducing the digest moving picture data pieces extracted by the moving picture data extracting section in a prescribed order as digest data;
wherein the moving picture data extracting section comprises:
an extracted data piece number deciding section for deciding a partial digest time assigned to each of the groups on the basis of a total play time of the original moving picture data piece or pieces in each of the groups, the number of the original moving picture data piece or pieces in each of the groups, and the digest time decided by the digest time deciding section, and for deciding an extracted data piece number assigned to each of the groups on the basis of the decided partial digest time and an extraction unit time length concerning the digest moving picture data pieces which is determined according to given rules; and
an extraction implementing section for extracting a digest moving picture data piece or pieces from the original moving picture data piece or pieces in each of the groups on the basis of the extracted data piece number decided by the extracted data piece number deciding section.

* * * * *